(12) United States Patent
Orff (10) Patent No.: US 10,070,600 B2
(45) Date of Patent: Sep. 11, 2018

(54) AEROPONIC SYSTEM

(71) Applicant: Dylan Orff, Wilton, ME (US)

(72) Inventor: Dylan Orff, Wilton, ME (US)

( * ) Notice: Subject to any disclaimer, the term of this patent is extended or adjusted under 35 U.S.C. 154(b) by 255 days.

(21) Appl. No.: 15/014,282

(22) Filed: Feb. 3, 2016

(65) Prior Publication Data

US 2016/0227719 A1   Aug. 11, 2016

Related U.S. Application Data (60) Provisional application No. 62/113,642, filed on Feb. 9, 2015.

(51) Int. Cl.
  *A01G 31/00*   (2018.01)
  *A01G 31/02*   (2006.01)

(52) U.S. Cl.
  CPC ........ *A01G 31/02* (2013.01); *A01G 2031/006* (2013.01); *Y02P 60/216* (2015.11)

(58) Field of Classification Search
  CPC ......... A01G 31/02; A01G 31/00; A01G 31/06
  See application file for complete search history.

(56) References Cited

U.S. PATENT DOCUMENTS

| | | | |
|---|---|---|---|
| 4,514,930 A | 5/1985 | Schorr et al. | |
| 4,669,217 A * | 6/1987 | Fraze | A01G 31/001 47/59 R |
| 5,010,686 A | 4/1991 | Rivest | |
| 6,233,870 B1 * | 5/2001 | Horibata | A01G 31/02 47/59 R |
| 6,336,292 B1 * | 1/2002 | Boxsell | A01G 31/02 47/62 C |
| 7,823,328 B2 | 11/2010 | Walhovd | |
| 8,726,568 B2 * | 5/2014 | Wilson | A01G 31/00 47/62 R |
| 9,144,206 B1 * | 9/2015 | Rubanenko | A01G 31/02 |
| 2001/0047617 A1 * | 12/2001 | Blossom | A01G 31/02 47/62 R |
| 2003/0089037 A1 * | 5/2003 | Ware | A01G 31/02 47/83 |
| 2004/0055213 A1 * | 3/2004 | Wainwright | A01G 31/02 47/62 A |
| 2009/0126269 A1 * | 5/2009 | Wilson | A01G 31/00 47/62 R |
| 2010/0154300 A1 * | 6/2010 | Wiersma | A01G 31/02 47/64 |
| 2012/0005957 A1 * | 1/2012 | Downs, Sr. | A01G 31/02 47/62 A |
| 2014/0144078 A1 | 5/2014 | Gonyer et al. | |

FOREIGN PATENT DOCUMENTS

CA       2473590 A1 *  1/2005  ............ A01G 31/02

* cited by examiner

*Primary Examiner* — Kristen C Hayes
(74) *Attorney, Agent, or Firm* — Jeffrey Joyce, Esq.

(57) ABSTRACT

An aeroponic system that includes a number of grow chambers that support plants in a contaminant free environment above a reservoir that collects excess fluid. A pumping and piping system is provided to deliver nutrient fortified water to the plants in the grow chamber and to recycle or drain the excess liquid from the reservoir. A number of access ports provide a grower with access to the chambers and reservoir.

10 Claims, 10 Drawing Sheets

AEROPONIC SYSTEM

BACKGROUND INFORMATION

Field of the Invention

The invention relates to plant cultivation systems, and more particularly to aeroponic systems.

BACKGROUND OF THE INVENTION

Aeroponics is a process of growing plants without a growing medium, such as soil or a hydroponic environment, whereby the plant roots are suspended in air and periodically provided with a burst of fertilized water in the form of a misting spray. In the typical aeroponic system, the plants are suspended above a reservoir with the roots dangling into the reservoir. Some of the moisture is absorbed immediately when the roots are sprayed; the remainder of the water falls into the reservoir, where it often stagnates for a period of time before it is drained.

Initially, the roots are small and only dangle a short distance into the reservoir, however, as the roots grow and/or the water in the reservoir rises, the roots come to sit in the stagnant water, which negatively impacts the health of the plant. In aeroponic systems that include water recycling systems, the roots commonly become entangled in the pipes and pumping devices, which can prevent the system from working effectively.

Accessing the inside compartments of the typical aeroponic system also presents a challenge, because the only access point is generally through the opening that contains the plant and, as a result, the only way to clean the reservoir, fix the recycling system or to trim the roots is to remove the plant(s) from the system.

What is needed, therefore, is an aeroponic system that suspends the roots in a clean environment and that keeps the roots away from any stagnant water or other contaminants in the reservoir. What is further needed is such a system that provides a grower with access to the inside of the system for cleaning purposes as well as access to the roots and mechanical components of the system.

BRIEF SUMMARY OF THE INVENTION

The invention is an aeroponic system that includes a number of grow chambers positioned above a reservoir. Plants sit atop the grow chambers with the roots suspended within, and a drain is provided in the bottom of the chambers to allow excess liquid to exit the grow chamber and enter the reservoir. This arrangement allows the roots to grow in a clean environment, away from any stagnant water that may be found in the reservoir.

A pumping system delivers nutrient fortified water throughout the grow chambers and recycles the water that drains into the reservoir. Access ports provide a grower with access to the inside of the grow chambers and to the reservoir to allow for easy cleaning and maintenance of the system. Multiple sets of grow chambers and reservoirs may be combined to a single pump system.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-5 illustrate an aeroponic system 100 according to the invention comprising a fluid delivery and recovery system 10, a plurality of grow chambers 30, and a fluid recovery basin 50. The grow chambers 30 are mounted on top of the fluid recovery basin 50. The fluid delivery and recovery system 10 delivers fluid (not shown) to each grow chamber 30, after which the fluid drains from the grow chamber 30 into the fluid recovery basin 50 where the fluid is collected, filtered, and recycled through the fluid delivery and recycling system 10.

Figure 7:
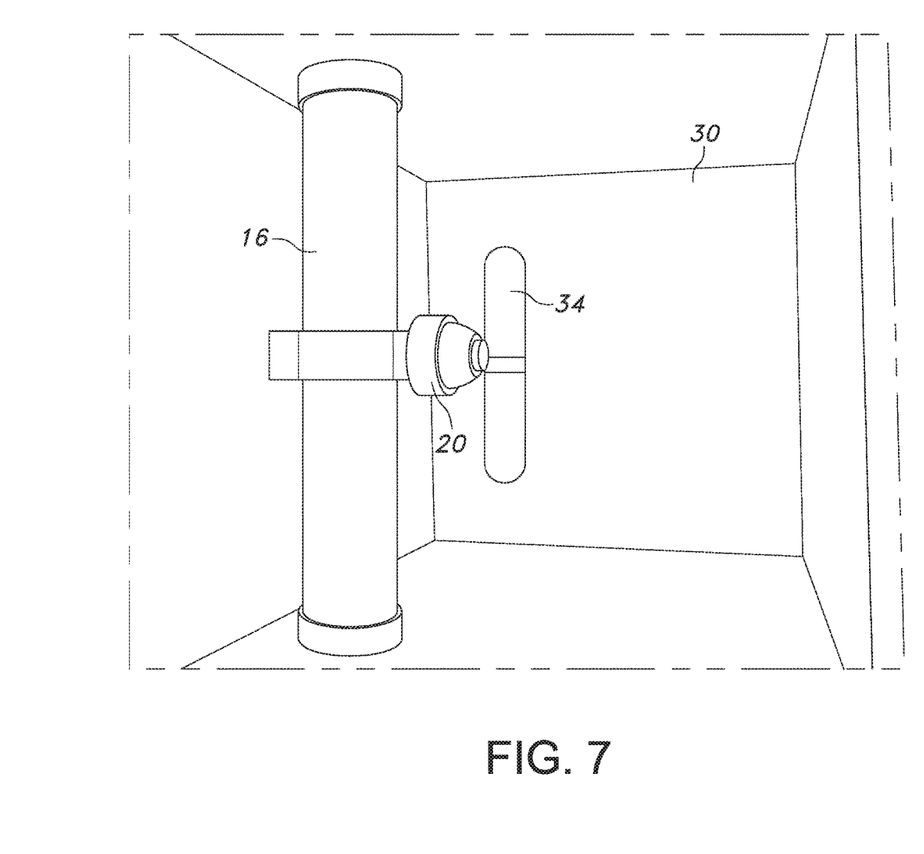
FIG. 7 is a top view of the inside of a grow chamber, showing the feed pipe and spray nozzle.

The grow chambers 30 have covers 32, that are attachable to the top of the grow chambers 30, and openings 34, shown in FIG. 7, in the bottom of the grow chambers 30 that allow the fluid to drain into the recovery basin 50. Containers 38 are insertable into an opening 35 in the covers 32. Plants are placed in the containers 38. The containers 38 support the weight of the plants and are constructed of a mesh material that allows the roots A to grow through the containers 38 into the grow chambers 30. The covers 32 have access ports 36 that provide convenient access to the inside of the grow chamber 30 when the cover 32 is attached. The access ports 36 may have access port covers (not shown).

The fluid delivery and recovery system 10 contains fluid (not shown), which is typically fertilizer enriched water, and includes a pumping system 14 and an arrangement of feed pipes 16 and return pipes 18. The pumping system 14 forces the fluid through the feed pipes 16 that pass through the grow chambers 30. Spray nozzles 20, shown in FIG. 7, which spray the plant roots A with the fluid, are attached to the feed pipes 16 inside of each grow chamber 30. The plant roots A absorb some the fluid as it flows down along the roots A. The fluid eventually drains through openings 34 in the bottom of the grow chamber 30 and into the fluid recovery basin 50. Once the fluid is in the fluid recovery basin 50, the pumping system 14 forces the fluid through the return pipes 18 and into a filtering system 24, which in turn recycles the fluid through the feed pipes 16. Any suitable pumping system, piping system, and spray nozzles may be used to deliver the fluid.

Figure 1:
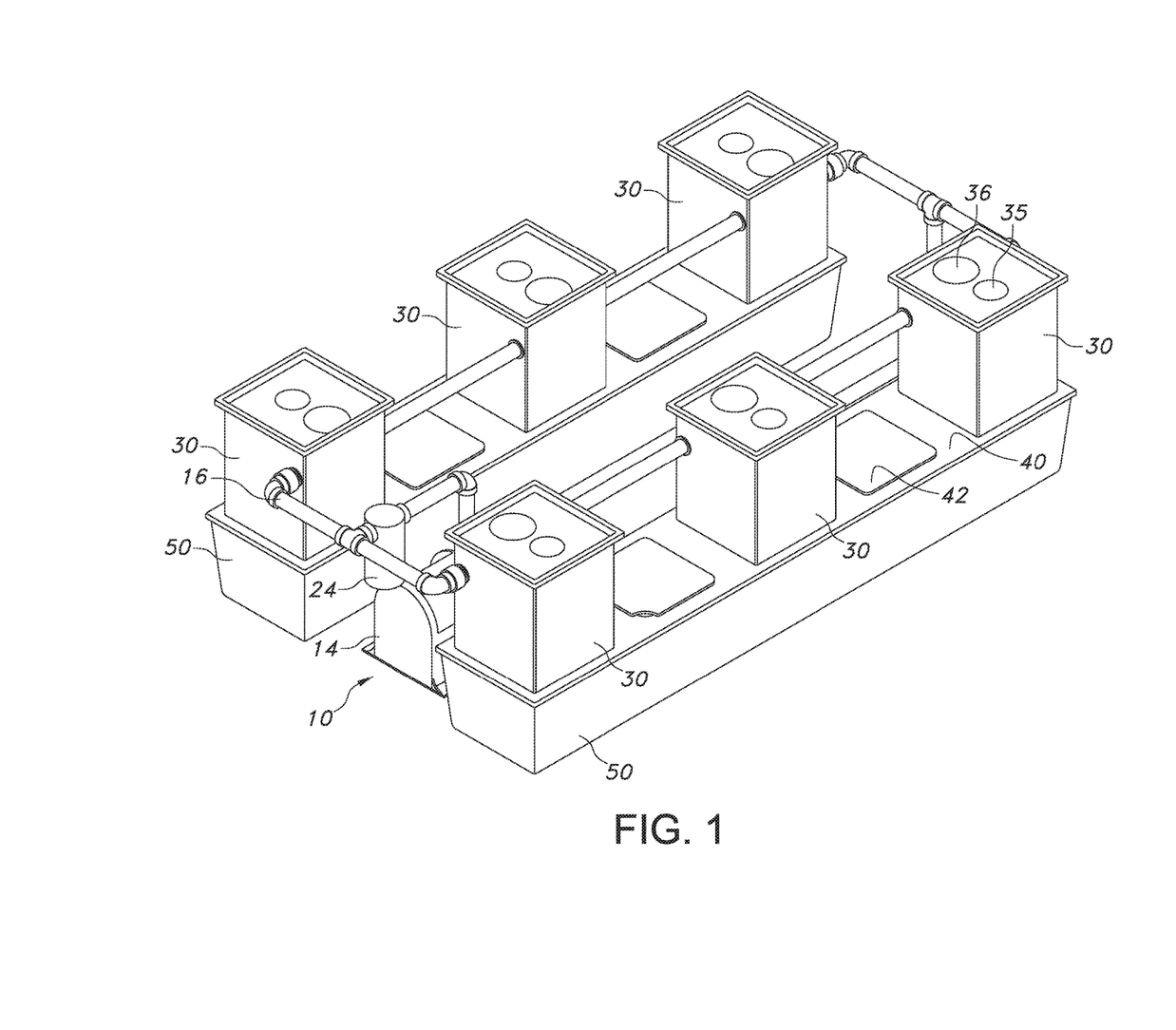
FIG. 1 is a perspective view of the aeroponic system according to the invention.
Figure 2:
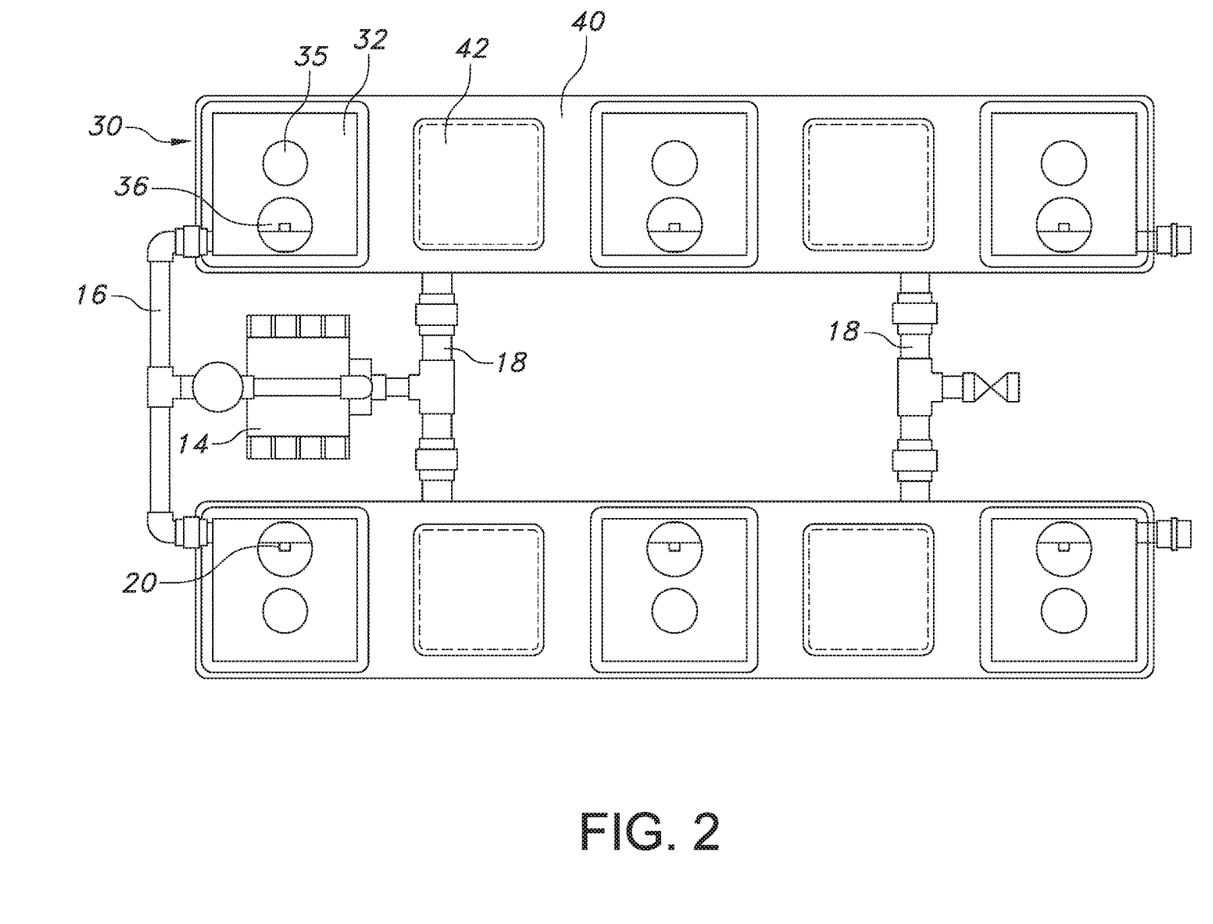
FIG. 2 is a top plan view of the aeroponic system.
Figure 3:
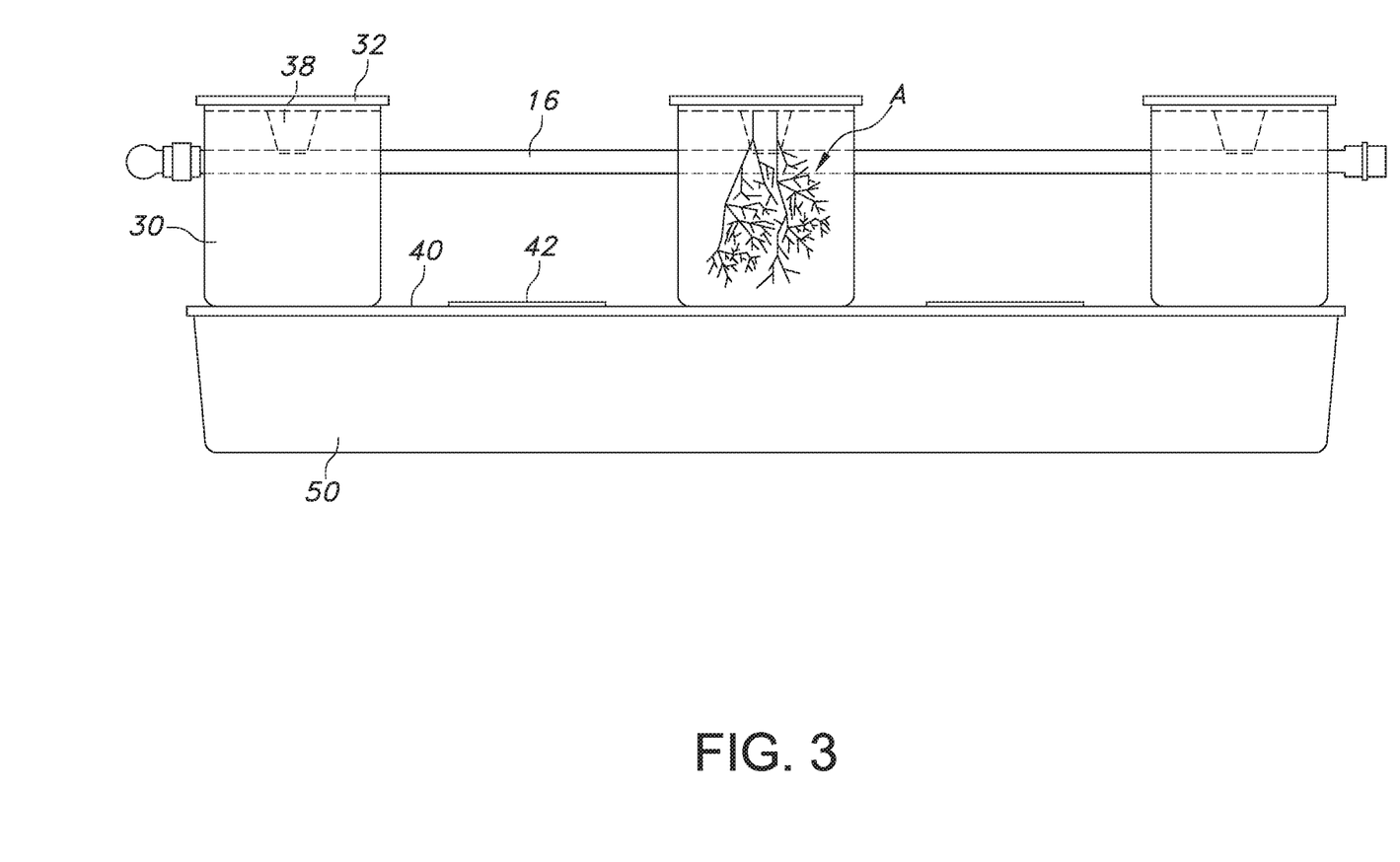
FIG. 3 is a side plan view of the aeroponic system, showing the roots of a plant in the grow chamber.
Figure 4:
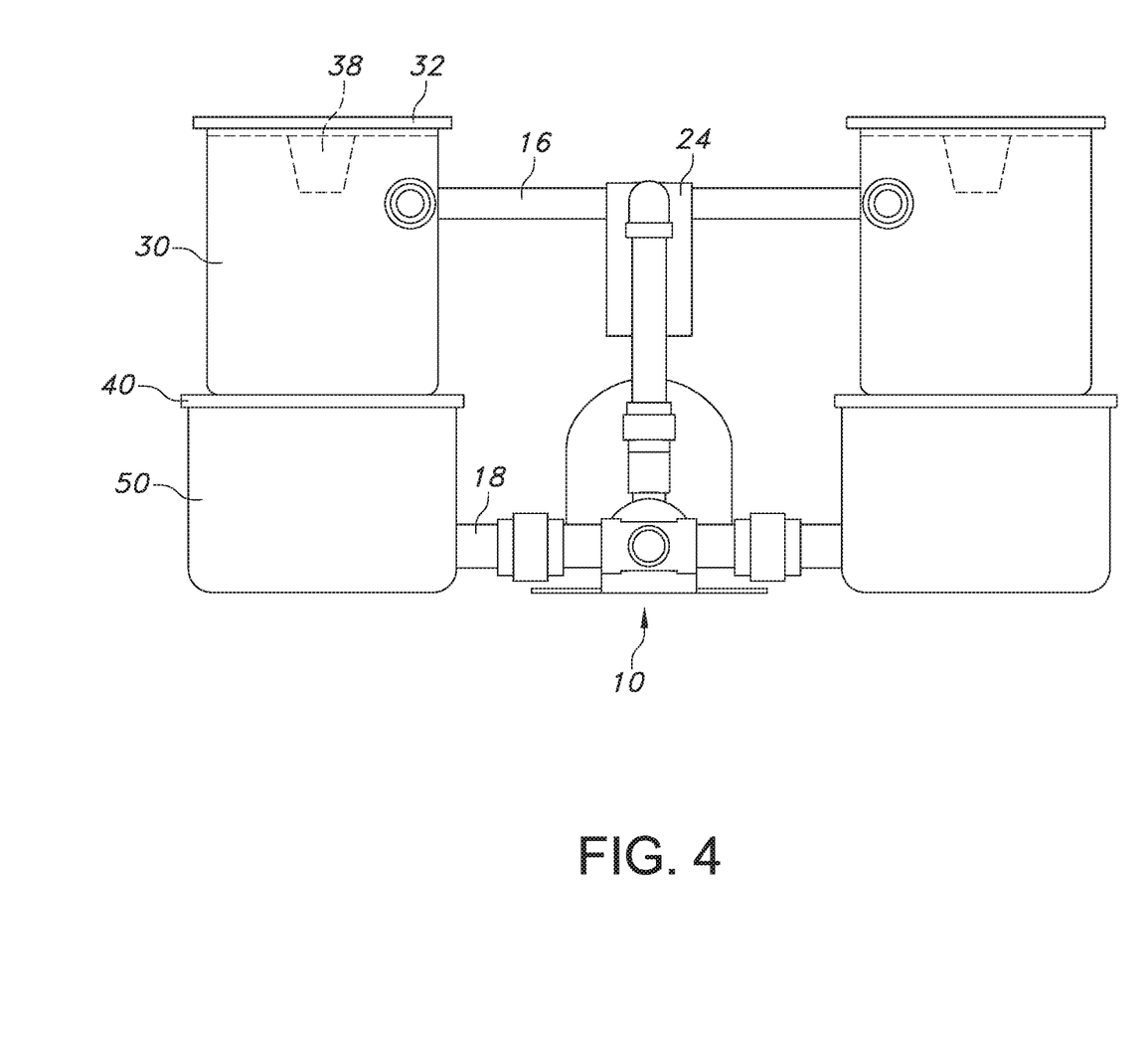
FIG. 4 is a rear plan view of the aeroponic system.
Figures 5, 6:
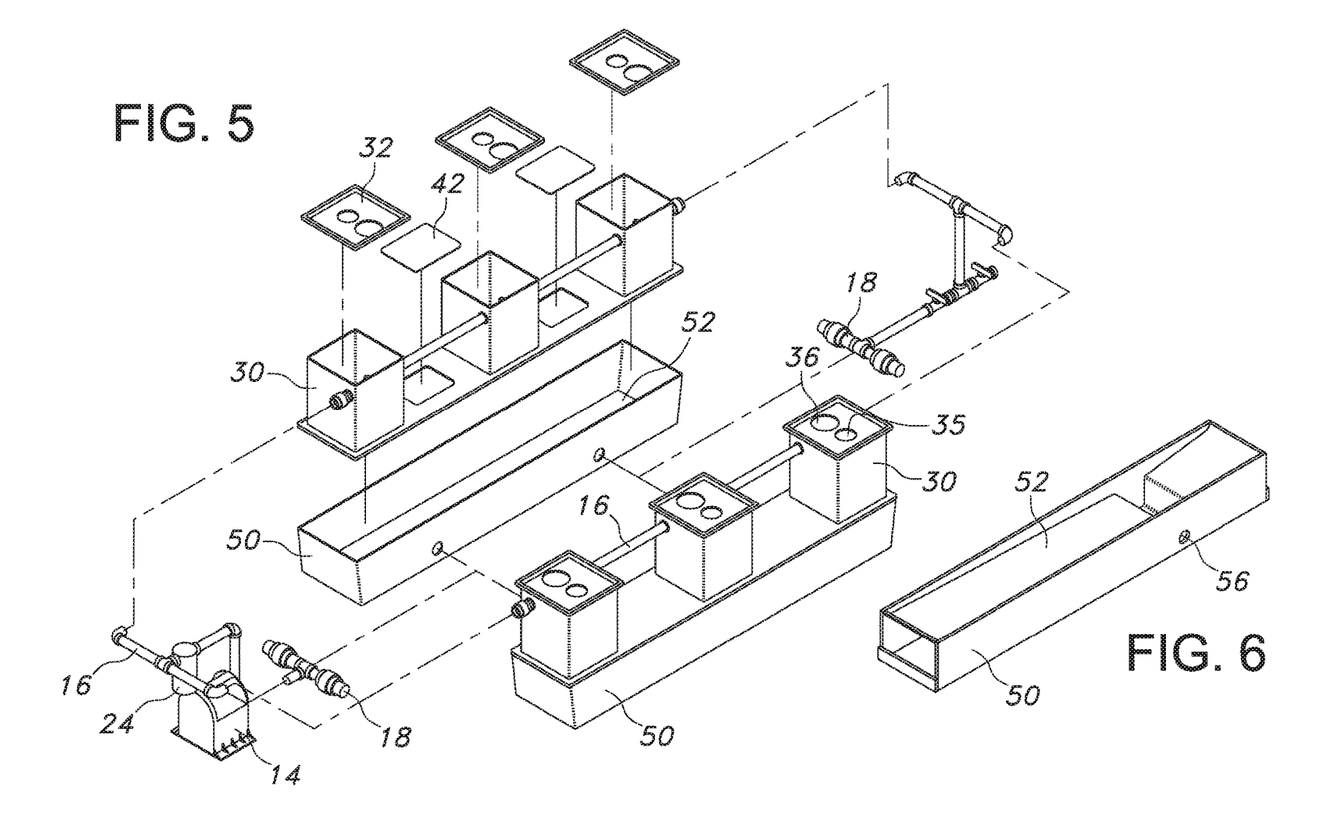
FIG. 5 is an exploded view of the aeroponic system.
FIG. 6 is a perspective view of the recovery basin with an inclined base.

FIGS. 5 and 6 illustrate the fluid recovery basins 50, the return pipes 18, and the pumping system 14, with the grow chambers 30. The recovery basin 50 shown in FIG. 5 illustrates a flat and comparatively deep recovery basin 50, whereas the recovery basin 50 shown in FIG. 6 has a slanted base 52 that guides the fluid to an exit port 56 where it is captured by the return pipes 18. The slanted base 52 creates a system 100 that requires less water and provides for faster recycling of the fluid. FIG. 5 also illustrates a system in which the grow chambers 30 are coupled to each other by a grow chamber platform 40. Use of the grow chamber platform 40 allows a number of grow chambers 30 to be added or removed as a single unit. Platform access ports 42 are provided in the platform 40, to enable convenient access to the fluid recovery basin 50, and also to allow the user to check that roots A do not interfere with the fluid delivery and recovery system 10.

FIG. 7 illustrates a top view of the grow chamber 30 with the feed pipe 16 and the spray nozzle 20 and the drain opening 34 to allow fluid to flow into the recovery basin 50.

The arrangement of the grow chambers 30 above the fluid recovery basin 50 allows the plant roots A to grow in an environment in which the plants receive clean, fertilizer-enriched fluid. This is in contrast to existing systems in which the roots are frequently exposed to stagnant water, often submerged in the same container as the previously used and non-recycled stagnant water, and provides for a healthier and faster growing plant. The grow chamber access ports 36 provides convenient access to the inside of the grow chamber 30, without first having to remove the plant or otherwise disassemble the system, which is desirable for a number of reasons. For one, the sprayer 20 may require maintenance, for example, to repair a clog or another type of malfunction. For another, the roots may grow in a manner that causes them to become intertwined with or otherwise interfere with the fluid delivery and recovery system 50, thereby requiring access to the roots A. Not having to remove the plant first saves on time and effort and is also better for plant development.

Figure 8:
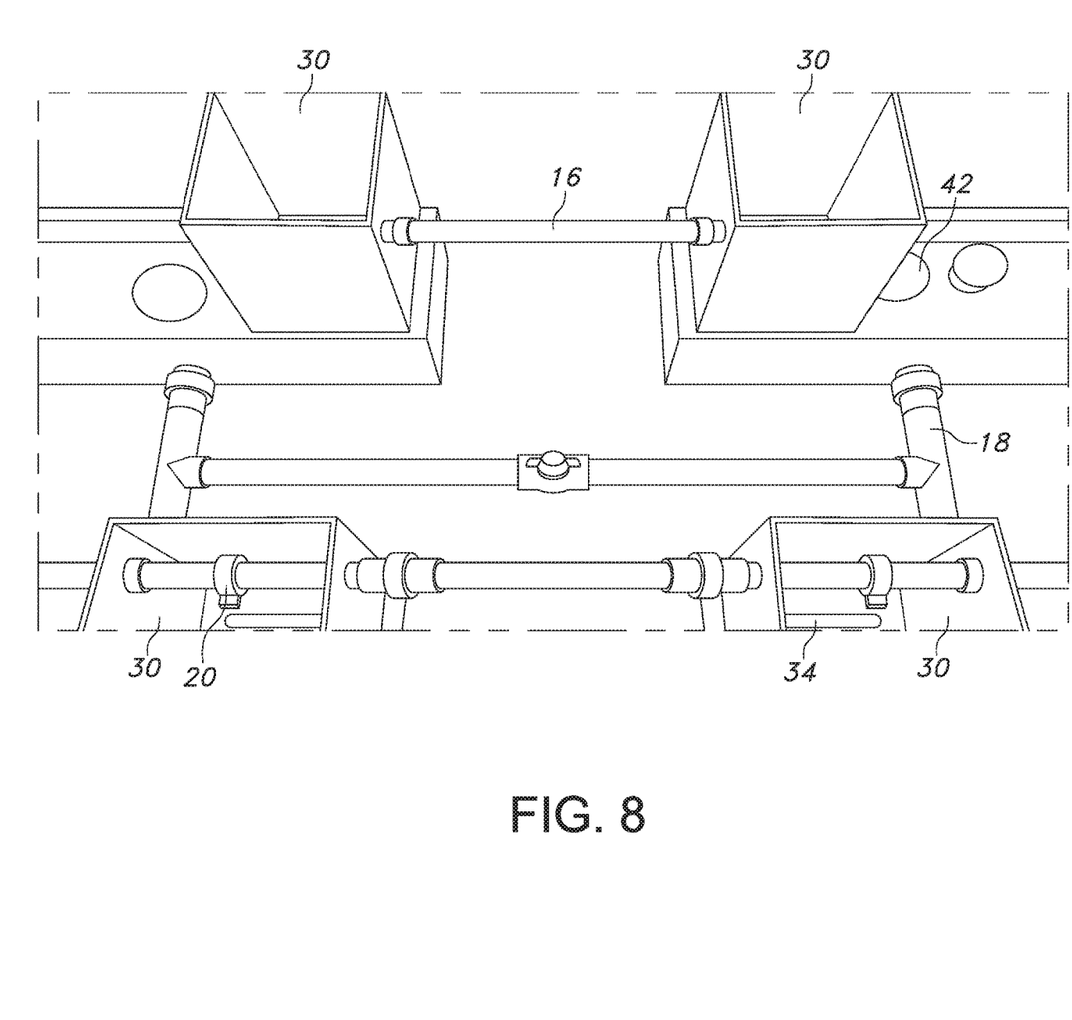
FIG. 8 is a perspective view of multiple sets of grow chambers and the connecting feed pipes and return pipes.

In one embodiment, one fluid delivery and recovery system 10 provides fluid to two sets of three grow chambers 30 that are each positioned on top of one recovery basin 40. Additional components may be added to this configuration to allow a user to grow more plants in a single fluid delivery and recovery system. FIG. 8 illustrates the connection of four sets of three grow chambers 30, whereby one fluid delivery and recovery system 50 would circulate fluid through twelve grow chambers.

Figure 9:
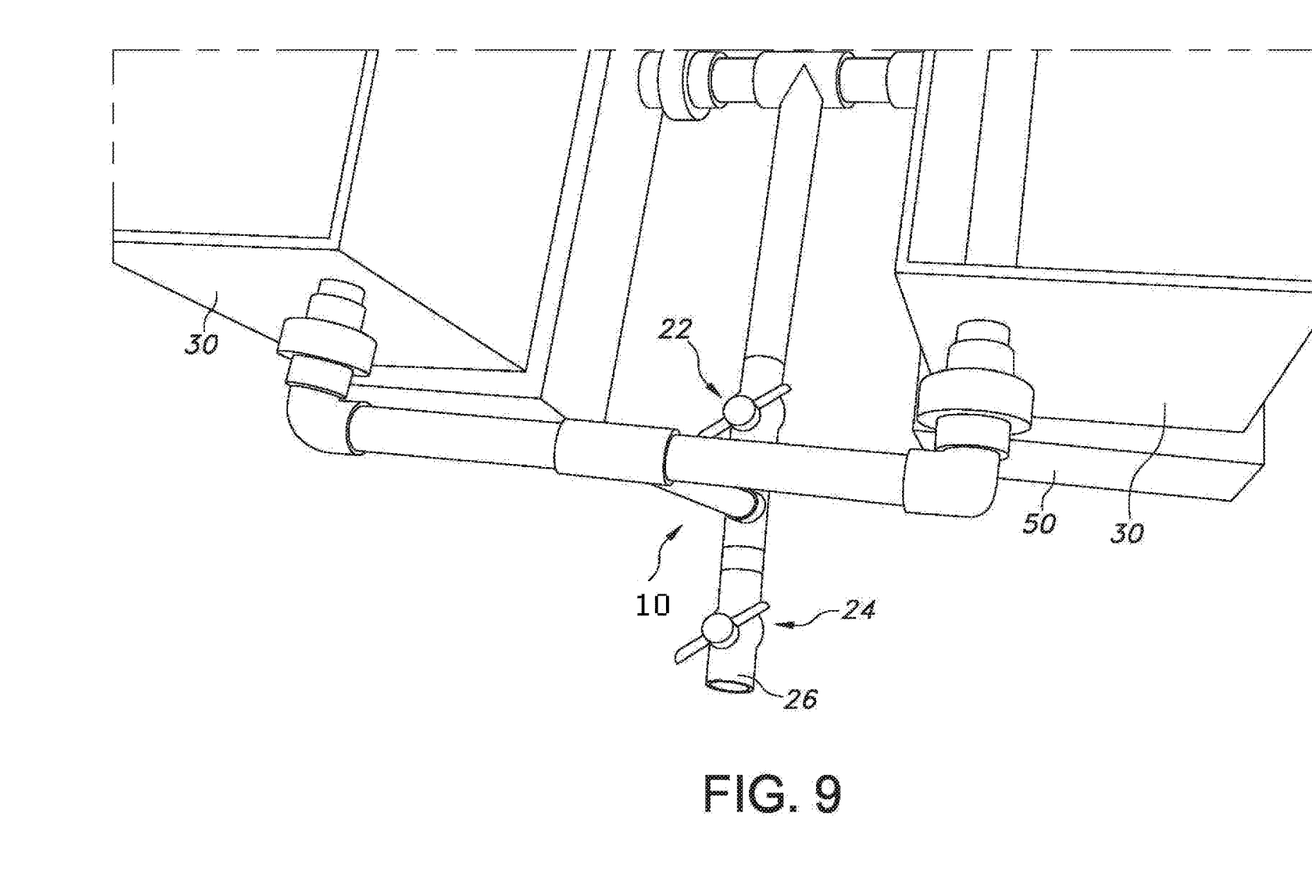
FIG. 9 is a perspective view of one embodiment of the fluid delivery and recovery system.

FIG. 9 illustrates an embodiment of the fluid delivery and recovery system 10 with drain pipe 26 and two additional valves 22 and 24. When valves 22, 24 are both closed, the aeroponic system functions as previously described. When valve 22 is open and valve 24 is closed, liquid is pumped through the feed pipes 16 and into the recovery basin 50. When valve 24 is open and valve 22 is closed, the pumping system 14 will cause the aeroponic system to drain quickly through drain pipe 26. When valves 22 and 24 are both open, the aeroponic system will drain at a normal rate through drain pipe 26.

Figure 10:
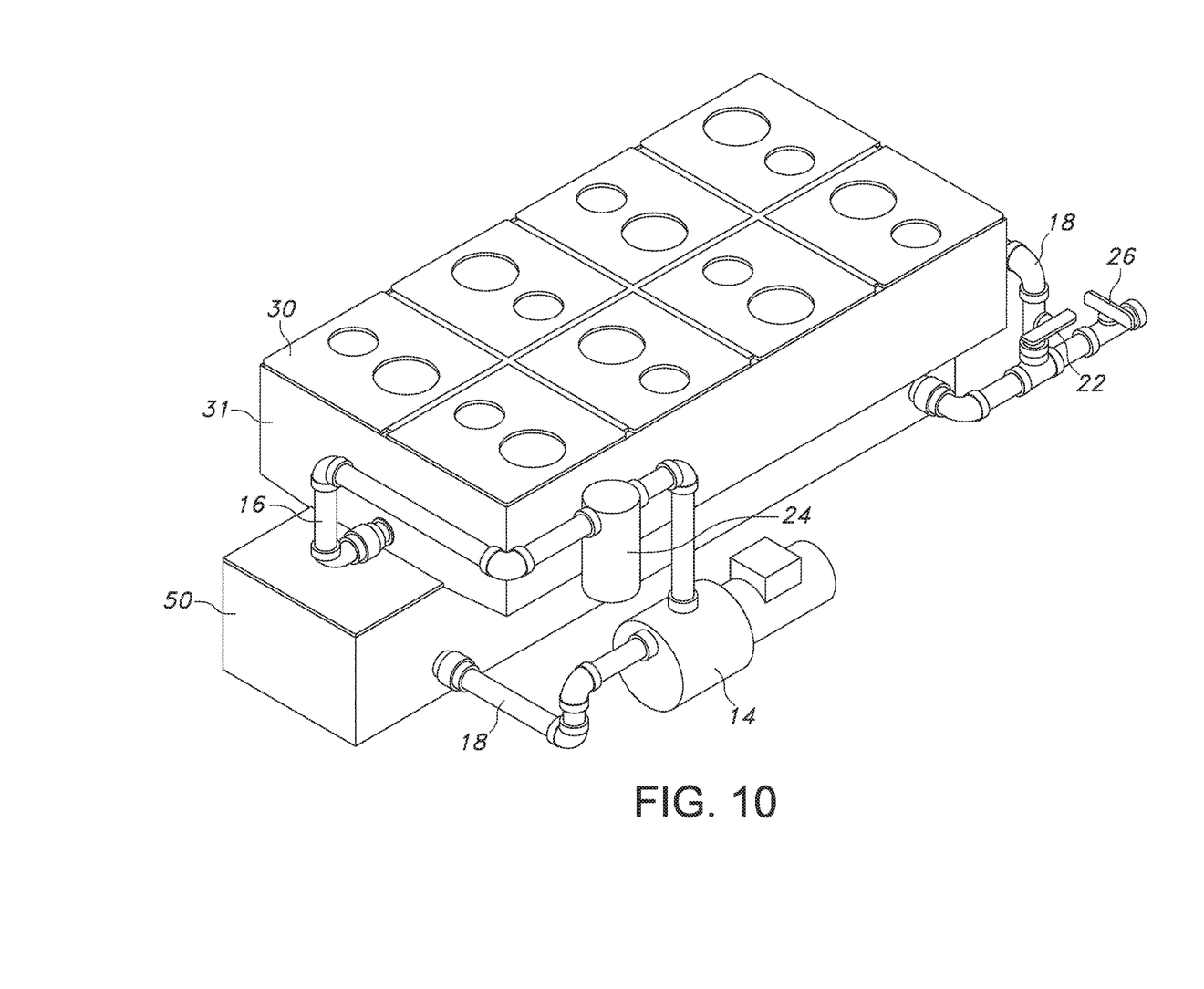
FIG. 10 is a perspective view of the second configuration of the grow chambers.
Figures 11, 12A, 12B:
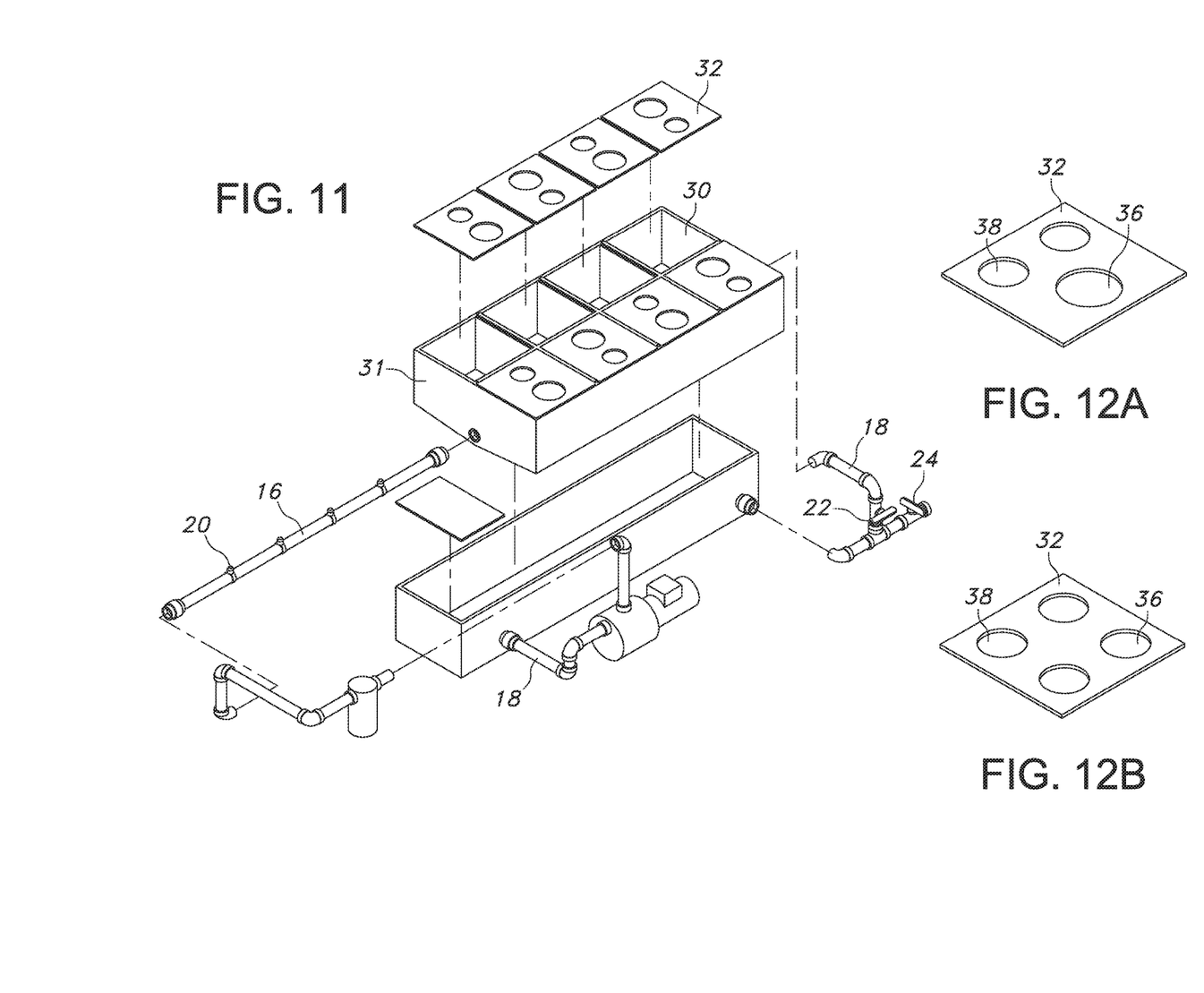
FIG. 11 is an exploded view of the second configuration of the grow chambers.
FIG. 12A is a top view of the grow chamber cover with one access port and two containers.
FIG. 12B is a top view of the grown chamber cover with two access ports and two containers.

FIGS. 10 and 11 illustrate a configuration of the aeroponic system 100 in which a number of grow chambers 30 are contained within a single enclosure 31 that is set atop a single recovery basin 50. This configuration allows for the growth of a number of plants in a small amount of space.

FIGS. 12A and 12B illustrate alternative embodiments of the cover 32 having multiple access ports 36 and/or containers 38.

It is understood that the embodiments described herein are merely illustrative of the present invention. Variations in the construction of the aeroponic system may be contemplated by one skilled in the art without limiting the intended scope of the invention herein disclosed and as defined by the following claims.

What is claimed is:

1. An aeroponic system comprising:
    a fluid delivery and recovery system;
    a plurality of grow chambers, each grow chamber of the plurality of grow chambers being covered by a cover, and wherein the cover has a container for holding a plant;
    a fluid recovery basin;
    wherein the grow chambers are mountable above the fluid recovery basin;
    and wherein the fluid delivery and recovery system distributes fluid throughout the plurality of grow chambers, which then drains into the fluid recovery basin where it is recovered and recycled by the fluid delivery and recovery system.

2. The aeroponic system of claim 1 wherein the fluid recovery basin includes a plurality of fluid recovery basins and wherein one or more grow chambers are mounted above each one of the fluid recovery basins.

3. The aeroponic system of claim 1 further comprising a grow chamber platform and wherein one of more of the plurality of grow chambers is placed on the grow chamber platform, which is then placed on top of the fluid recovery basin.

4. The aeroponic system of claim 3, wherein the grow chamber platform has a plurality of recovery basin access ports.

5. The aeroponic system of claim 1, wherein the recovery basin has a titled base.

6. The aeroponic system of claim 1, wherein the plurality of grow chambers is contained within a single enclosure to form a set of grow chambers that is handled as a single unit and that is mountable above the fluid recovery basin.

7. An aeroponic system comprising:
    a fluid delivery and recovery system;
    a plurality of grow chambers;
    a fluid recovery basin;
    a grow chamber platform;
    wherein one or more of the plurality of grow chambers is placed on the grow chamber platform, which is mountable above the fluid recovery basin; and
    wherein the fluid delivery and recovery system distributes fluid throughout the plurality of grow chambers, which then drains into the fluid recovery basin where it is recovered and recycled by the fluid delivery and recovery system.

8. The aeroponic system of claim 7, wherein the grow chamber platform has a plurality of recovery basin access ports.

9. The aeroponic system of claim 7, wherein the recovery basin has a titled base.

10. The aeroponic system of claim 7, wherein the plurality of grow chambers is contained within a single enclosure to form a set of grow chambers that is handled as a single unit and that is mountable on the grow chamber platform above the fluid recovery basin.

* * * * *